Figure 1:
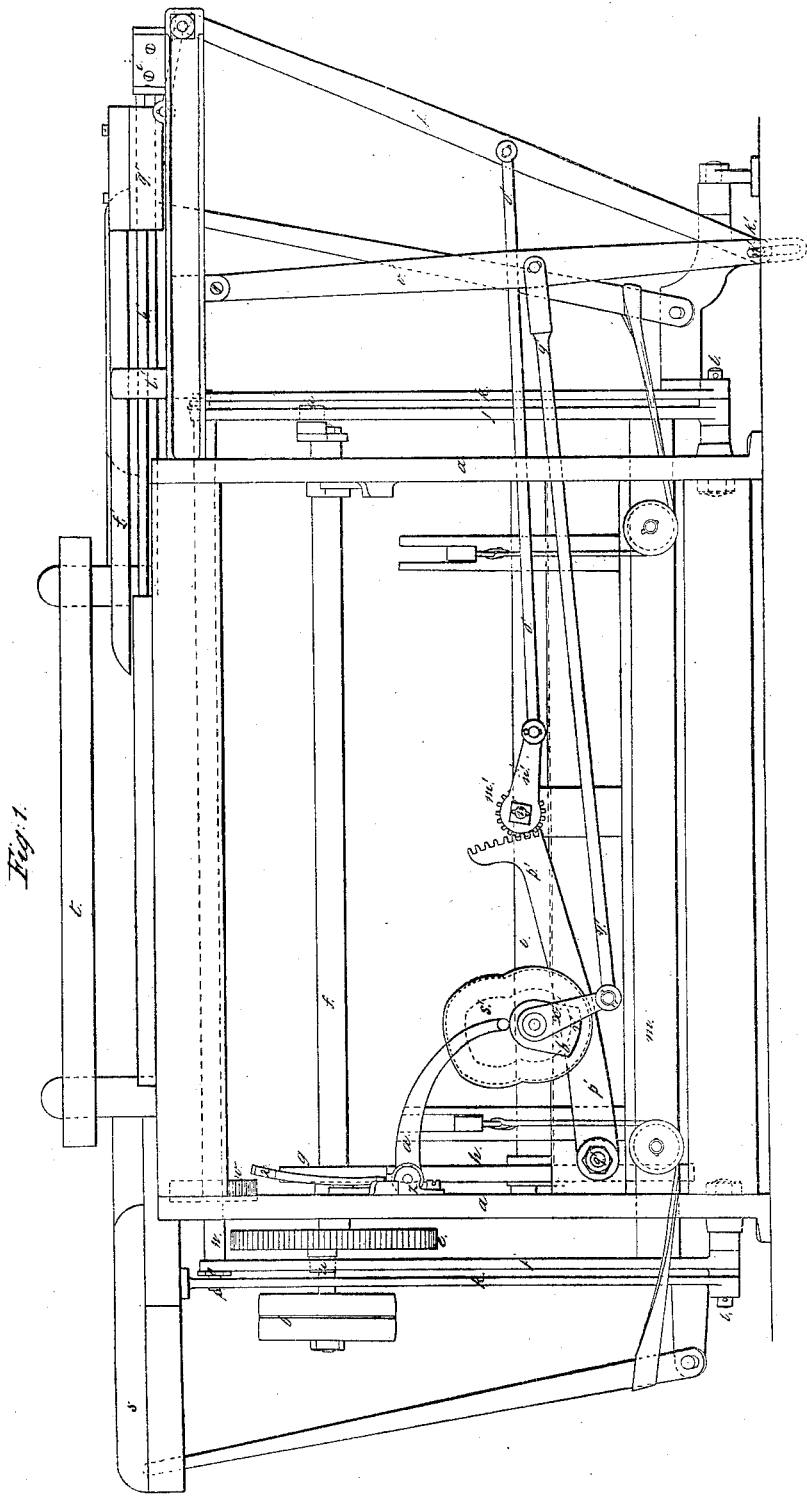

E. B. Bigelow.
Weaving Pile Fabric.

N° 6,186. Patented Mar. 13, 1849.

E. B. Bigelow.
Weaving Pile Fabric.
N°.6,186. Patented Mar. 13, 1849.
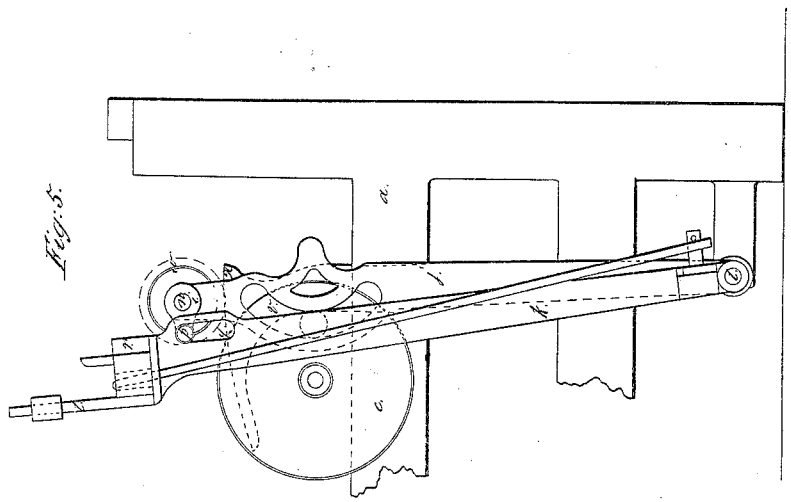
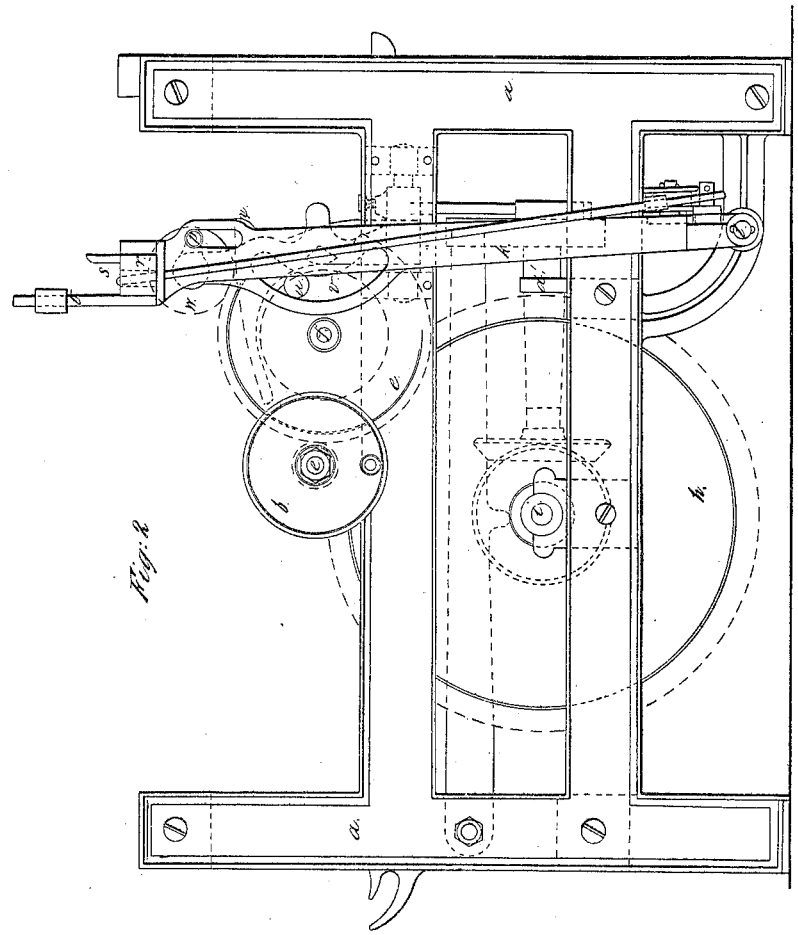

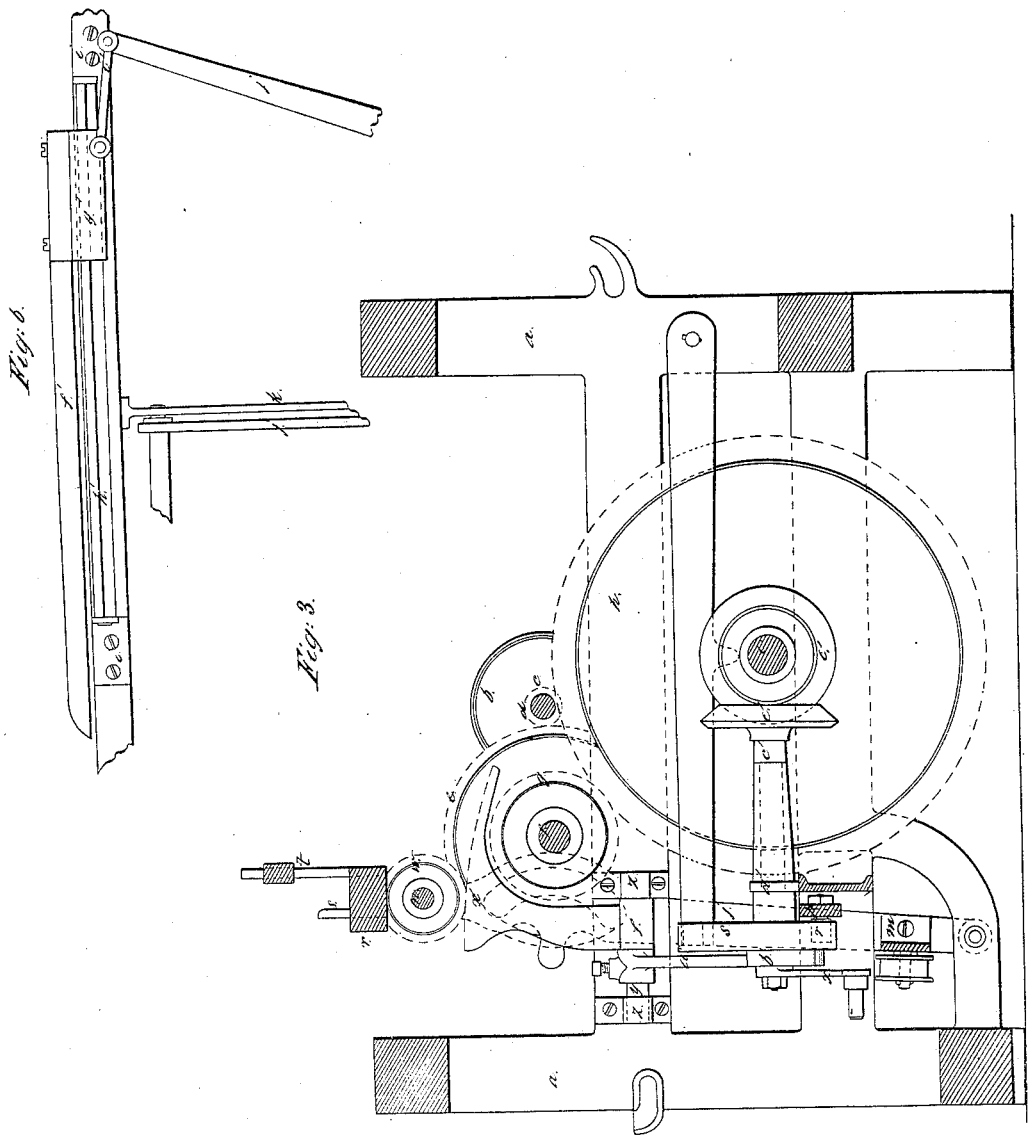
E. B. Bigelow.
Weaving Pile Fabric.
N° 6,186. Patented Mar. 13, 1849.
Sheet 3-4 Sheets.

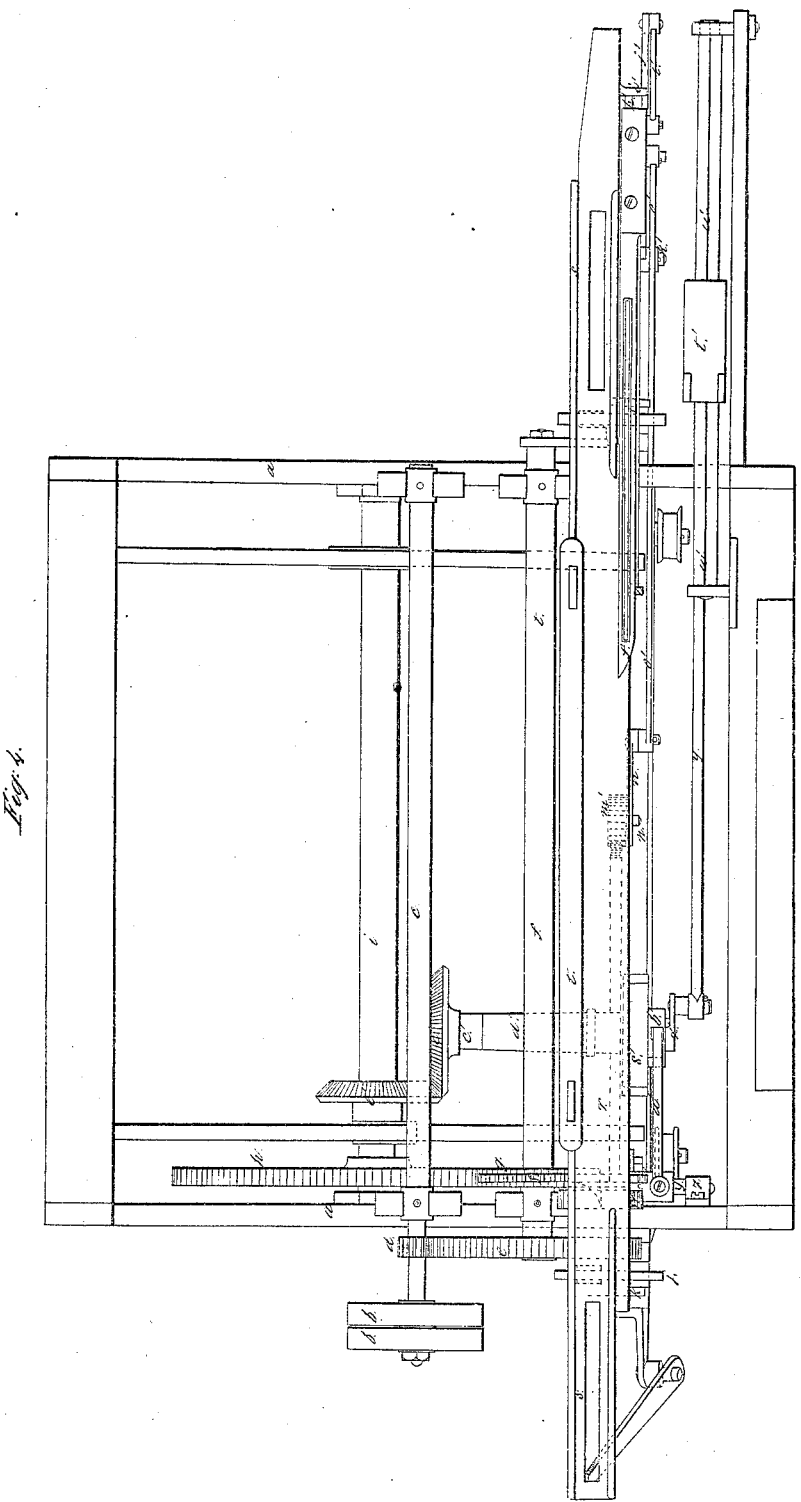

UNITED STATES PATENT OFFICE.

E. B. BIGELOW, OF BOSTON, MASSACHUSETTS.

LOOM FOR WEAVING BRUSSELS CARPETING, &c.

Specification forming part of Letters Patent No. 6,186, dated March 13, 1849; Reissued November 20, 1849, No. 150.

*To all whom it may concern:*

Be it known that I, ERASTUS B. BIGELOW, of Boston, in the county of Suffolk and Commonwealth of Massachusetts, have invented new and useful Improvements in Power-Looms for Weaving Brussels Carpets and other Similar Wrought Fabrics, of which the following is a full and exact description, reference being had to the accompanying drawings, which from a part of my specification.

My improvements consist in operating the lathe of the loom, in combination with a trough or grooved bar employed to carry the wires under the warps, in such a manner as to effect the operation of "clearing the stud."

Not deeming it necessary to describe all the parts essential to a complete Brussels carpet loom, I shall limit my specification to those parts which are requisite to explain my improvements.

In Plate I, Figure 1 is a front view of the loom, Fig. 2 an end view, and Fig. 3 a section showing the inside view of the loom, when looking toward the left end.

In Plate II, Fig. 4 is a plan, and Figs. 5 and 6 are views of parts in detail.

In Plates I and II, $a$, $a$, $a$, $a$, represent the frame of the loom, and $b$, $b$, the driving pulleys which operate the shaft $c$. The pinion $d$, engages with the cogged wheel $e$, and turns the lathe shaft, $f$. The cogged wheel $g$, (see Fig. 3) engages with the cogged wheel $h$, and turns the cam shaft $i$, which imparts motion to many of the principal parts of the loom. The respective sizes of the cogged wheels $g$, and $h$, are in the ratio of one of the former to four of the latter.

To effect the operation of clearing the shed, I cause the trough or grooved bar, employed to carry the wires under the figuring warps, to remain under said warps during the next successive beat of the lathe after it has entered to introduce a wire, so that in its advance toward the face of the cloth, it shall separate the upper from the lower portion and make a clear stud.

The said trough or grooved bar being connected with the race beam of the lathe, and situated in advance of the reed, it will be obvious by inspecting its position in the drawings, that if the lathe is moved forward to the extent of its motion while the said trough or grooved bar remains in the warps as aforesaid, it would carry said trough or grooved bar so far forward as to break the warps, or carry them out of their proper position. To obviate this objection, I give to the race beam a counter motion, which causes it to remain back in a proper position, while the main swords of the lathe advance in the regular way. To apply this counter motion, two pairs of swords are employed, viz: the main swords $j$, $j$, and the auxiliary swords $k$, $k$, which vibrate on their respective studs $l$, $l$. The main swords $j$, $j$, are connected together near their lower ends by the girth $m$.

$n$, is a rotating shaft, which is formed with shoulders to receive the upper ends of the main swords $j$, $j$.

$o$, $o$, are crank arms which are secured to the shaft $n$, in such a manner as to prevent the main swords $j$, $j$, from receding from each other, thus giving to the shaft $n$, somewhat the office of a connecting girth.

The crank rollers $p$, $p$, are attached to the crank arms $o$, $o$, and work in the slots $q$, $q$, in the auxiliary swords $k$, $k$. The race beam $r$, is affixed to the upper ends of the auxiliary swords $k$, $k$, and is constructed with the shuttle boxing $s$, $s$, and the reed frame $t$, in the ordinary way.

The lathe shaft $f$, imparts a continued vibratory motion to the main swords $j$, $j$, through the action of the crank rollers $u$, $u$, working in the circular slots $v$, $v$. Now while the shaft $n$, remaining at rest with its crank arms $o$, $o$, in the position seen in Fig. 2 the race beam $r$, moves with the main swords $j$, $j$, in the same manner as though it was securely affixed to it: but when the counter motion before mentioned is required, the shaft $n$, is made to turn, during the advance motion of the main swords $j$, $j$, to the position seen in Fig. 5, thus causing the race beam and trough or grooved bar to remain back in the required position; then, as the main swords $j$, $j$, move backward, the shaft $n$, returning to its former position, as seen in Fig. 2, where it remains until another wire is introduced.

The shaft $n$ is made to turn at the required time, in the following manner. Affixed to the shaft $n$, is the cogged wheel $w$, the circumference of which is equal to the space passed over by the motion of the main swords of the lathe $j$, $j$, at the pitch line, on the lower side of the wheel.

$x$ represents a segment of gear attached to the shaft $y$, which turns in the stands $z\ z$. The ends of the teeth of the cogged wheel $w$, and of the segment $x$ which present together are wedge-shaped, to enable them readily to engage with each other. $a'$ is an arm, one end of which is attached to the shaft $y$; and the other extends down to the cam $b'$, on the shaft $c'$. The shaft $c'$ turns in the stand $d'$, and is actuated by the cam shaft $i$ through the action of the miter gear $e'\ e'$.

While the lathe is back in a comparative state of rest, that is to say, while the rollers $u,\ u$, are moving through the circular slots $v,\ v$, the cam $b'$ raises the arm $a'$ and engages the segment $x$ with the cogged wheel $w$, when the main swords $j,\ j$, move forward to the extent of their motion, the shaft $n$, by the action of the segment $x$, performs half a revolution; then as the main swords $j,\ j$, move back again, the shaft $n$, is turned to its former position, and the cam $b'$ disengages the segment $x$ from the cogged wheel $w$, which allows the whole of the lathe to move together as before.

The trough or grooved bar for introducing the wires is operated as follows: a top view of this trough or bin is seen at $f'$ in Fig. 4, and a side view in Fig. 6. The trough $f'$ is affixed to the sliding box $g'$, which clasps and traverses the angular bar $h'$. The bar $h'$ is supported by the stands $i'\ i'$, which are secured to the race beam $r$.

$j'$ is an upright lever which vibrates on a stud $k'$ at its lower end, and is connected by the bar $l'$ at its upper end to the sliding box $g'$. $m'$ is a cogged wheel which turns on the stud $n'$, and has a crank $n''$ affixed to it.

$o'$ is a bar which connects the crank $n''$ with the lever $j'$.

$p'$, is a lever which vibrates at one end on the stud $g'$, and has a segment of a gear on the opposite end, which engages with the cogged wheel $m'$. The lever $p'$ has a stud projecting from its side, carrying the roller $r'$, which is represented by dotted lines in Fig. 1.

Affixed to the shaft $c'$ is a double cam $s'$, whose acting surfaces are represented by dotted lines, and act upon the roller $r'$. Now to cause the trough or grooved bar $f'$ to enter the warps to carry in a wire and clear the shed, the cam $s'$ forces down the lever $p'$, and turns the crank $n''$, which takes said trough or grooved bar $f'$ forward to the position seen in Fig. 4. After said trough or grooved far has been moved toward the face of the cloth, to clear the shed as above described, and has discharged its wire, the cam $s'$ raises the lever $p'$, and turns the crank $n''$ back, which takes the parts connected with it to the position seen in Fig. 1.

The wires may be drawn from the cloth, and transferred from the pincers to the trough or grooved bar, in the same manner as described in my Letters Patent for new and useful improvements in machinery for weaving Brussels carpets, dated March 20th, 1847. I will, however, describe the manner in which I move the pincers for drawing the wires, in connection with the above described parts.

$t'$ represents the pincer stand, which is so formed as to grasp and traverse the angular bar $u'$.

$v'$, is a lever, the upper end of which is jointed to the underside of the pincer stand $t'$, and the lower end works upon a stud $w'$.

$x'$ is a crank attached to the shaft $c'$, and is connected with the lever $v'$ by the bar $y'$. The shaft $c'$ performs one revolution every wire to be drawn, thus giving to the pincers the proper reciprocating motion.

Having fully described my improvement in the foregoing specification, what I claim as new and desire to secure by Letters Patent, is;—

1. The moving the trough or grooved bar $f'$ forward toward the face of the cloth, when between the warps, for clearing the stud, in the manner above described.

2. I claim the said trough or grooved bar $f'$, in combination with the lathe of the loom; whether said lathe be constructed with two pairs of swords as above described, or in any other way which shall give to the race beam a counter motion, or move the said trough or grooved bar $f'$ forward between the warps, for the purpose, and in the manner above set forth, or in any other way which shall accomplish the same end by substantially the same means.

E. B. BIGELOW.

Witnesses:
ESRA LINCOLN, Jr.,
LUTHER BRIGGS, Jr.

[FIRST PRINTED 1913.]